UNITED STATES PATENT OFFICE.

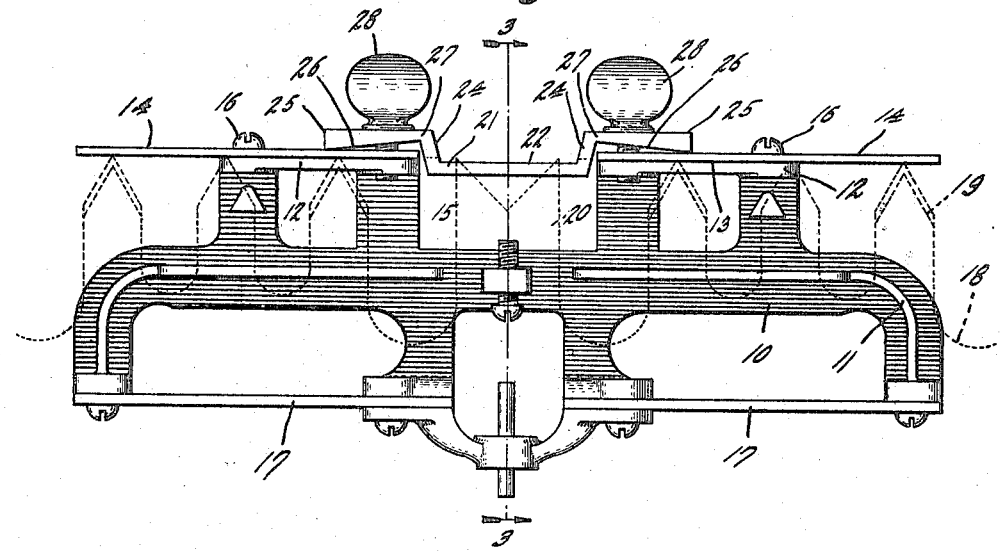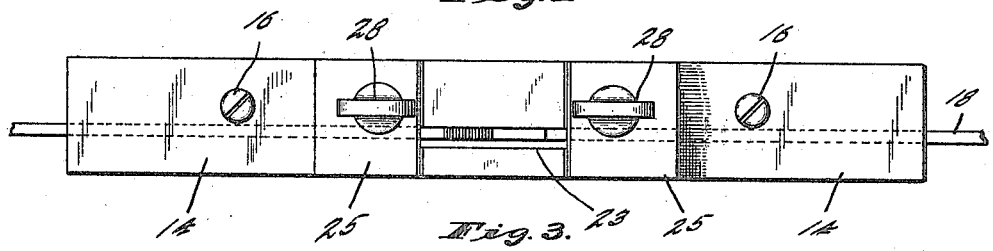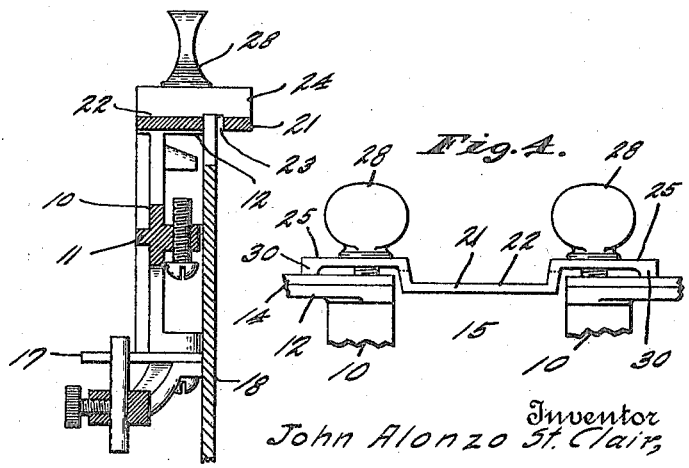

JOHN ALONZO ST. CLAIR, OF INDIANAPOLIS, INDIANA, ASSIGNOR TO E. C. ATKINS & COMPANY, OF INDIANAPOLIS, INDIANA, A CORPORATION OF INDIANA.

SAW-GAGE.

1,187,936.

Specification of Letters Patent.

Patented June 20, 1916.

Application filed September 2, 1915. Serial No. 48,583.

*To all whom it may concern:*

Be it known that I, JOHN ALONZO ST. CLAIR, a citizen of the United States, residing at Indianapolis, in the county of Marion and State of Indiana, have invented a new and useful Saw-Gage, of which the following is a specification.

It is the object of my invention to provide a saw gage whereby the raking teeth of cross cut saws may be accurately shortened by any desired amount relative to the cutting teeth, which amount may be varied easily, conveniently, and accurately as desired, without requiring the use of shims and similar devices.

The accompanying drawing illustrates my invention.

Figure 1 is an elevation of a saw gage embodying my invention; Fig. 2 is a plan view of such saw gage; Fig. 3 is a section on the line 3—3 of Fig. 1; and Fig. 4 shows a modification.

The frame 10, which is conveniently cut away at various parts for lightness and is provided with ribs 11 for stiffening purposes, is provided along its upper edge with two horizontal flanges 12 the upper surfaces 13 of which are machined in the same plane and have mounted thereon two flat metal guide plates 14, which though separate practically form parts of a single guide plate. The adjacent ends of the guide plates 14, and also the adjacent ends of the flanges 12, are spaced apart by a distance greater than the greatest width of raking tooth for which the saw gage is to be used, to provide a gap or space 15. The guide plates 14 are fastened to the flanges 12 by screws 16, and project forward beyond the edges of the flanges 12. These front edges of the flanges 12, and the corresponding edges of plates 17 fastened to the lower edge of the frame 10, serve as guides which bear against the side of the saw blade 18, and the under sides of the overhanging parts of the guide plates 14 serve as a guiding surface for the points of the cutting teeth 19 of the saw 18, interspersed among which cutting teeth 19 in any desired manner are raking teeth 20, which are to be shorter by a few thousandths of an inch, the amount varying for different conditions, than are the cutting teeth 19. To provide for obtaining this shortening of the raking teeth, a gage plate 21 having a flat upper gaging surface 22 is provided in the space 15. This plate 21 has a slot 23 in the plane of the saw 18, for receiving the saw teeth. By varying the relation between the upper surface 22 of the gage plate 21 and the under surface of the guide plates 14, the saw teeth may be made to project any desired distance through the slot 23 and above the gaging surface 22, so that when the raking teeth 20 thus project they may be filed off by the distance they project. In order to support the gage plate 21 so that the position of its upper surface 22 may conveniently be varied, it is provided at its ends with upwardly extending portions 24 from the upper ends of which extend lateral projections 25 which only at their free ends bear on the guide plates 14, over which they project. This is most conveniently accomplished by providing these projections with under surfaces 26 which are downwardly inclined toward their free ends. These lateral projections are preferably thinnest at the points 27, where they join the upwardly extending portions 24, so that they may bend at these thin points 27. Thumb screws 28 project through holes in the lateral extensions 25 and the guide plates 14 into threaded holes in the flange 12, being located between the points where such lateral projections bear on the guide plates and the weakened points 27 where such lateral projection joins the upwardly extending portions 24. By tightening these thumb screws 28, the projections 25 are bent at their thin points 27 to depress the gaging surface 22 relatively to the surface 13 to increase the projection of the raking teeth 20 above such gaging surface 22. By loosening these thumb screws 28, the projections 25 are caused to bend back again by their own resiliency to elevate the gaging surface 22 relatively to the surface 13 to reduce the projection of the raking teeth 20 above such gaging surface 22. When the gaging surface 22 is properly adjusted, the raking teeth are filed off flush with such surface, while the points of the cutting teeth bear against the under side or guiding surface of the guide plates 14. Any inaccuracy in machining, or any wear caused by any possible filing off of the gaging surface 22, may be compensated for by varying the setting of the thumb screws 28, though on account of the hardening of the plate 21 there is very little wearing off of the gaging surface 22.

While the preferred form of my invention is as above described, modifications are possible. One of those is shown in Fig. 4. Here the only difference is in the lateral projections from the gaging plates. These lateral projections 25, in the modification, have parallel upper and lower surfaces, instead of having inclined lower surfaces, and are thus of uniform strength throughout; but they have bosses 30 at their free ends on their under surfaces, so that they are spaced from the guide plate 14 except at said bosses. This modification operates in substantially the same way as the one first described.

I claim as my invention:

1. A saw gage, comprising a guide plate having a guiding surface for the cutting teeth of a cross-cut saw to abut against, a gage plate having a gaging surface on the opposite side from the saw and roughly in line with the guiding surface of said guiding plate, said gage plate having two separated bearing points outside the limits of its gaging surface, and a tightening screw acting on said gage plate between said two bearing points to produce bending to vary slightly the relation between said guiding surface and said gaging surface.

2. A saw gage, comprising a guide plate having a guiding surface for the cutting teeth of a cross-cut saw to abut against, a gage plate having a gaging surface on the opposite side from the saw and roughly in line with the guiding surface on said guiding plate, said gage plate being slotted to allow the raking teeth of the saw to project through to such gaging surface and having two separated bearing points outside the limits of its gaging surface, and a tightening screw acting on said gage plate between said two bearing points for producing bending to vary slightly the relation between said guiding surface and said gaging surface.

3. A saw gage, comprising a guide plate having a plane guiding surface for the cutting teeth of a cross-cut saw to abut against, a gage plate having a plane gaging surface on the opposite side from the saw and roughly in line with the plane guiding surface on said guiding plate, said gage plate having two separated bearing points outside the limits of its gaging surface, and a tightening screw acting on said gaging plate between said two bearing points for producing bending to vary slightly the relation between said guiding surface and said gaging surface.

4. A saw gage, comprising a guide plate having a guiding surface for the cutting teeth of a cross-cut saw to abut against, a gage plate having a gaging surface on the opposite side from the saw and roughly in line with the guiding surface on said guiding plate, said gage plate having two separated bearing points outside the limits of its gaging surface and being weakened at a point between said two bearing points, and a tightening screw acting on said gage plate between said two bearing points to produce bending at the weakened point to vary slightly the relation between said guiding surface and said gaging surface.

5. A saw gage, comprising a guide plate having a plane guiding surface for the cutting teeth of a cross-cut saw to abut against, said guide plate having a gap in it, a gage plate mounted in said gap and having a plane gaging surface on the opposite side from the saw and roughly in line with the plane guiding surface on said guiding plate, said gage plate being slotted to allow the raking teeth of the saw to project through to such gaging surface and having two opposite projections extending away from such gap, each of said projections having a bearing point at its free end and being weakened at its end toward the body of the gage plate, and a tightening screw acting on each projection between said weakened point and said bearing point so that by tightening or loosening said screws bending may be produced at said weakened points to vary the relation between said guiding and gaging surfaces.

6. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in line with the guiding surface of said guiding plate, said gage plate being slotted to allow the raking teeth of the saw to project through to such gaging surface and having two opposite projections extending away from such gap, each of said projections having a bearing point, and a tightening screw acting on each projection so that by tightening or loosening said screws bending may be produced to vary the relation between said guiding and gaging surfaces.

7. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in line with the guiding surface on said guiding plate, said gage plate having two opposite projections extending away from such gap, each of said projecttions being weakened at its end toward the body of the gage plate and having a bearing point removed from such weakened point, and a tightening screw acting on each projection at a point removed from said bearing point so that by tightening or loosening said screws bending may be produced at said weakened points to vary the relation between said guiding and gaging surface.

8. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in line with the guiding surface on said guiding plate, said gage plate having two opposite projections extending away from such gap, each of said projections having a bearing point and being weakened at a point removed from such bearing point, and a tightening screw acting on each projection so that by tightening or loosening said screws bending may be produced at said weakened points to vary the relation between said guiding and gaging surfaces.

9. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in line with the guiding surface on said guiding plate, said gage plate having two opposite projections extending away from such gap, each of said projections having a bearing point at its free end and being weakened at its end toward the body of the gage plate, and a tightening screw acting on each projection between said weakened point and said bearing point so that by tightening or loosening said screws bending may be produced at said weakened points to vary the relation between said guiding and gaging surfaces.

10. A saw gage, comprising a guide plate having a plane guiding surface for the cutting teeth of a cross-cut saw to abut against, said guide plate having a gap in it, a gage plate mounted in said gap and having a plane gaging surface on the opposite side from the saw and roughly in line with the plane guiding surface on said guiding plate, said gage plate having two opposite projections extending away from such gap, each of said projections having a bearing point at its free end, and a tightening screw acting on each projection between said gage plate and said bearing point so that by tightening or loosening said screws bending may be produced to vary the relation between said guiding and gaging surfaces.

11. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in the line of the guiding surface on said guiding plate, said gage plate having two opposite projections extending away from such gap, each of said projections having a bearing point at its free end, and a tightening screw acting on each projection between said gage plate and said bearing point so that by tightening or loosening said screws bending may be produced to vary the relation between said guiding and gaging surfaces.

12. A saw gage, comprising a guide plate having a plane guiding surface for the cutting teeth of a cross-cut saw to abut against, said guide plate having a gap in it, a gage plate mounted in said gap and having a plane gaging surface on the opposite side from the saw and roughly in line with the plane guiding surface on said guiding plate, said gage plate having two opposite projections extending away from such gap, each of said projections having a bearing point, and a tightening screw acting on each projection so that by tightening or loosening said screws bending may be produced to vary the relation between said guiding and gaging surfaces.

13. A saw gage, comprising a guide plate having a guiding surface for the cutting teeth of a cross-cut saw to abut against, said guide plate having a gap in it, a gage plate mounted in said gap and having a gaging surface on the opposite side from the saw and roughly in the line of the guiding surface on said guiding plate, said gage plate having two opposite projections extending away from such gap, each of said projections having a bearing point, and a tightening screw acting on each projection so that by tightening or loosening said screws bending may be produced to vary the relation between said guiding and gaging surfaces.

In witness whereof, I have hereunto set my hand at Indianapolis, Indiana, this 27th day of August, A. D. one thousand nine hundred and fifteen.

JOHN ALONZO ST. CLAIR.